(12) United States Patent
Feuillade et al.

(10) Patent No.: US 10,018,883 B2
(45) Date of Patent: Jul. 10, 2018

(54) TRANSPARENT THIN FILM, PROCESS FOR MANUFACTURING A FILM, AND SPATIAL PHASE MODULATOR

(71) Applicants: ESSILOR INTERNATIONAL (COMPAGNIE GENERALE D'OPTIQUE), Charenton-le-Pont (FR); NIKON CORPORATION, Tokyo (JP)

(72) Inventors: Mathieu Feuillade, Tokyo (JP); Alain Goulet, Tokyo (JP)

(73) Assignees: ESSILOR INTERNATIONAL (COMPAGNIE GENERALE D'OPTIQUE), Charenton-le-Pont (FR); NIKON CORPORATION, Tokyo (JP)

( * ) Notice: Subject to any disclaimer, the term of this patent is extended or adjusted under 35 U.S.C. 154(b) by 34 days.

(21) Appl. No.: 15/101,298

(22) PCT Filed: Dec. 3, 2013

(86) PCT No.: PCT/EP2013/075423
§ 371 (c)(1),
(2) Date: Jun. 2, 2016

(87) PCT Pub. No.: WO2015/081991
PCT Pub. Date: Jun. 11, 2015

(65) Prior Publication Data
US 2016/0377906 A1    Dec. 29, 2016

(51) Int. Cl.
*G02F 1/1347* (2006.01)
*G02F 1/1333* (2006.01)
(Continued)

(52) U.S. Cl.
CPC .... *G02F 1/13471* (2013.01); *G02F 1/133711* (2013.01); *G02F 2001/133726* (2013.01);
(Continued)

(58) Field of Classification Search
CPC ......... G02F 1/133788; G02F 1/133711; G02F 1/1337; G02F 1/133753; G02F 1/1334;
(Continued)

(56) References Cited

U.S. PATENT DOCUMENTS 8,641,923 B2 *  2/2014  Lee ...................... C08F 2/48
                                                           252/299.01

OTHER PUBLICATIONS

International Search Report and Written Opinion issued in PCT/EP2013/075423, dated Jul. 1, 2014.
(Continued)

*Primary Examiner* — Thoi Duong
(74) *Attorney, Agent, or Firm* — Norton Rose Fulbright US LLP

(57) ABSTRACT

The invention concerns a transparent thin liquid crystal alignment film (1) including liquid crystals (2) within a polymerised liquid crystal composition, the film (1) comprising a first main surface (1a), a second main surface (1b) and a bulk (1c) comprised between said opposed two main surfaces (1a, 1b), for which: • in the vicinity of the first main surface (1a), the liquid crystals (2a) are aligned along a main first direction, • in the vicinity of the second main surface (1b), the liquid crystals (2b) are aligned along a main second direction, different from the first direction, and in between, the bulk (1c) comprises liquid crystals (2c) maintained in an isotropic orientation. The invention concerns also a process of manufacturing such a liquid crystal alignment film (1) and a polarization-independent spatial phase modulator including such a liquid crystal alignment film (1).

26 Claims, 6 Drawing Sheets

(51) Int. Cl.
*C09K 19/02* (2006.01)
*G02F 1/1337* (2006.01)

(52) U.S. Cl.
CPC ............ *G02F 2001/133738* (2013.01); *G02F 2203/01* (2013.01); *G02F 2203/06* (2013.01)

(58) Field of Classification Search
CPC .... G02F 1/133723; G02F 1/13; G02F 1/1333; G02F 1/133362; G02F 1/133365; G02F 1/13378; G02F 1/133784; G02F 1/1396; G02F 2001/133757; G02F 2001/133738; G02F 2001/133715; G02F 2001/13712; G02F 2001/13775; G02F 2001/13706; G02F 2001/13756; G02F 2202/022; G02F 2203/03; G02F 2203/12; G02F 1/1347; G02F 1/13471; G02F 2001/133726; G02B 5/3016; C09K 2219/03; C09K 19/00; C09K 19/02; C09K 19/38; Y10T 428/1005; Y10T 428/10; Y10T 428/1086; Y10T 156/10; H01L 51/0076; C09B 67/009

USPC ... 349/123, 194, 129, 193, 1, 127, 187, 132, 349/86, 179, 183, 126, 128; 252/299.01
See application file for complete search history.

(56) References Cited

OTHER PUBLICATIONS

Lin et al., "Polarization-independent liquid crystal phase modulator using a thin polymer-separated double-layered structure", *Optics Express*, 13(22): 8746-8752, 2005.

Ren et al., "Polarization-independent and fast-response phase modulators using double-layered liquid crystal gels", *Applied Physics Letters*, 88(6): 61123, 2006.

Chen et al., "A polarization-independent liquid crystal phase modulation using polymer-network liquid crystal with orthogonal alignment layers", *Proceedings of SPIE, SPIE International Society for Optical Engineering*, 8475: 84750S, 2012.

* cited by examiner

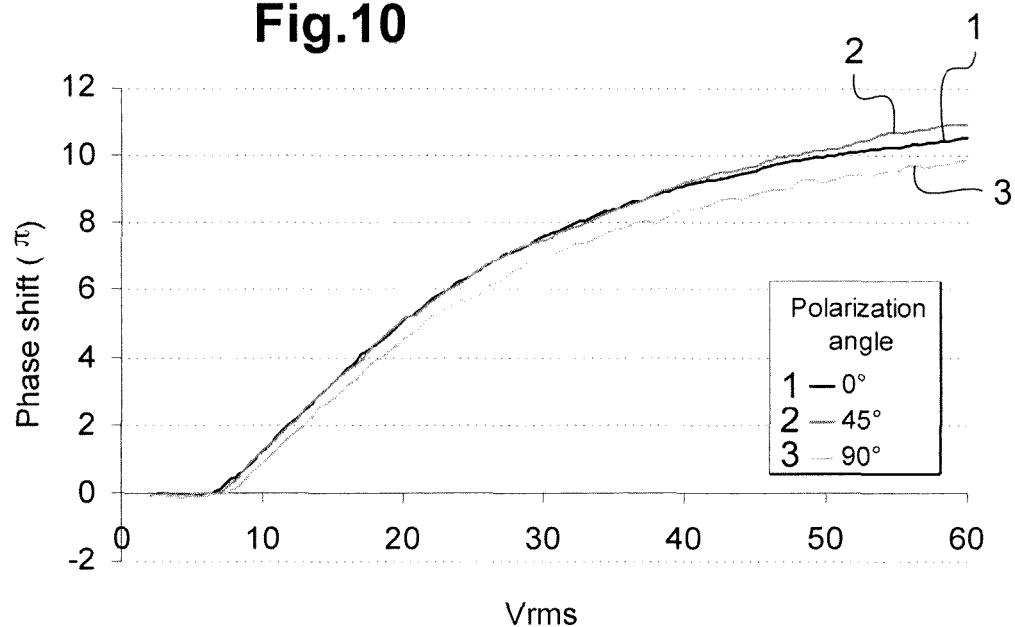
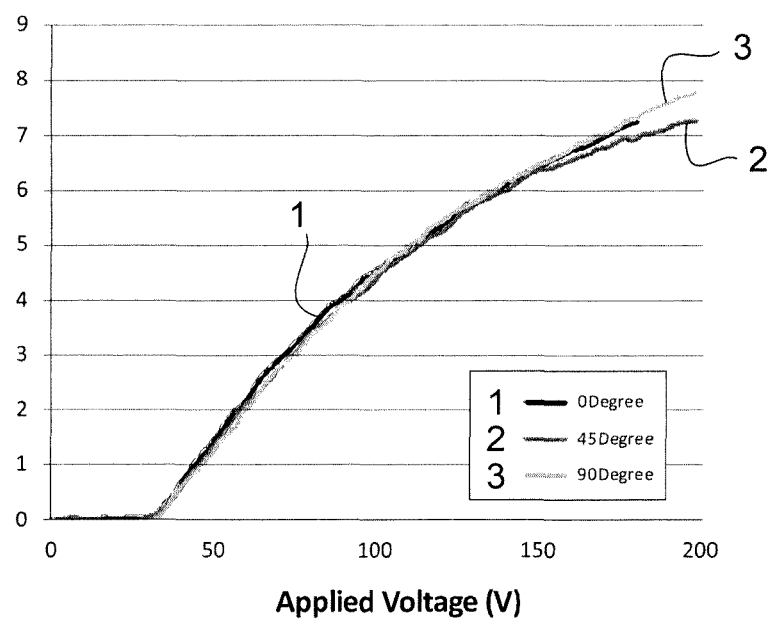

TRANSPARENT THIN FILM, PROCESS FOR MANUFACTURING A FILM, AND SPATIAL PHASE MODULATOR

CROSS-REFERENCE TO RELATED APPLICATIONS

This application is a national phase application under 35 U.S.C. § 371 of International Application No. PCT/EP2013/075423 filed 3 Dec. 2013, the entire contents of which is specifically incorporated by reference herein without disclaimer.

The present invention concerns in general polarization-independent transmissive spatial phase modulator (SPM) and in particular transparent thin films suitable for use as an intermediate layer for inducing alignment of the liquid crystals in the two liquid crystals cells of the SPM disposed on each surface of the intermediate layer as well as a process for making such transparent thin films.

Polarization-independent transmissive spatial phase modulators are known in the art. Polarization-independent means that phase modulation is not influenced by the polarization of an input light source impinging the SPM at normal incidence. In all what follows, it should be assumed that light illuminates the SPMs at normal incidence.

The published article "Polarization-independent phase modulator using a thin polymer-separated double-layered structure" Y. H. Lin, H. Ren, Y. H. Wu, Y. Zhao, J. Fang, Z. Ge and S. T. Wu, Opt. Express 13, 8746-8752 (Oct. 31, 2005) discloses a polarization-independent phase modulator having the structure shown in FIG. 1.

Figure 1:
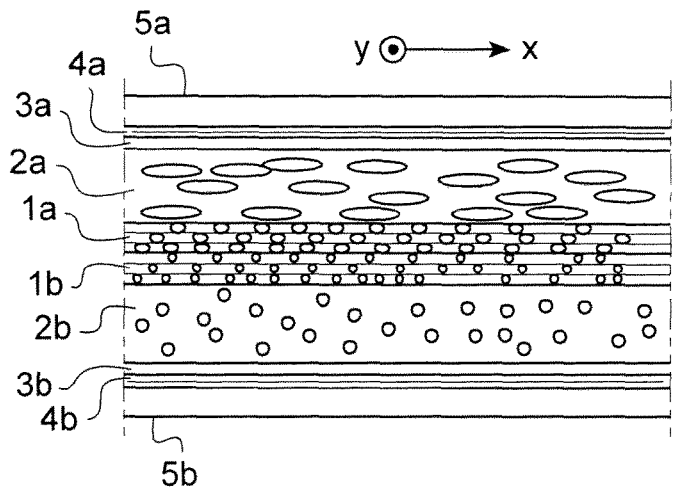

As seen in FIG. 1, the structure comprises a central intermediate layer 1, and starting from this central intermediate layer 1, on each side of the central intermediate layer 1,a stacking comprising, in the indicated order, a liquid crystal cell 2a, 2b, an insulating layer 3a, 3b, an electrode 4a, 4b and a supporting substrate 5a, 5b.

Constitution of the different elements of the stackings is known in the art.

The central intermediate layer 1 consists in a bi-layer film comprising adjacent first (1a) and second (2a) layers, each comprising a polymer in which anisotropically oriented liquid crystals are dispersed, the anisotropical orientation of the first layer of the film being different from the anisotropical orientation of the second layer of the film. Typically, the liquid crystals of the intermediate layer 1 are crossed oriented from one film layer to the other, thus inducing crossed orientation of the liquid crystals in the respective adjacent liquid crystal cells.

The above structure exhibits some drawbacks.

First, the fact that the intermediate layer 1 consists in a film of two distinct layers 1a, 1b will result in the presence of some birefringence if both film layers are not exactly of the same thickness, which means that the optical property of the entire stack will be polarization-dependent.

Secondly, due to its construction, this bi-layered central intermediate layer 1 is rather thick (typically 50 μm) compared to the upper and lower liquid crystal cells (15 μm each). Thus, this intermediate layer 1 acts like a shield towards the electric field applied between the two electrodes. As it will be explained below, it is preferable to decrease the thickness of the intermediate layer and increase its dielectric constant to limit the shielding effect.

Thus, the aim of the invention is to provide a transparent thin film suitable for use as an intermediate layer for inducing alignment of liquid crystals in the liquid crystal cells of a polarization-independent transmissive spatial phase modulator which remedies to the above drawbacks, and in particular does not provide any birefringence and can be made thin enough to reduce the shielding effect when used as an intermediate layer in a spatial phase modulator.

The present inventors have determined that the alignment capability of the liquid crystal (LC) parallel aligned polymer film is due to interactions only between the surface of the film and the LC molecules in contact with it. This means that in the prior art configuration of FIG. 1, the bulk of the LC parallel aligned polymer film (layers 1a and 1b of FIG. 1) is useless concerning the alignment capability. But this is because of the bulk of the film that some birefringence can appear if the respective thickness of layers 1a and 1b in FIG. 1 are not exactly identical.

Thus, the above goals are achieved according to the invention by providing a transparent thin film including liquid crystals and comprising a first main surface, a second main surface and a bulk comprised between the two said main surfaces and comprising liquid crystals, for which:
  in vicinity of the first main surface, liquid crystals are aligned along a main first direction,
  in vicinity of the second main surface, liquid crystals are aligned along a main second direction, different from the first direction, and in between the bulk comprises liquid crystals maintained in an isotropic arrangement.

The present invention also concerns a process for manufacturing a transparent thin film as defined above which comprises the following steps:
  providing a mold for a film comprising a mold cavity defined by a first main internal surface and a second main internal surface, for which the first main internal surface and the second main internal surface respectively have been submitted to a treatment which is adapted to align liquid crystals that are close to the first and second main internal surfaces of the mold into liquid crystal phases ordered according to respectively a first predetermined direction and a second predetermined direction different from the first direction,
  providing a polymerizable liquid crystal composition comprising at least a liquid crystal mesogen; the liquid crystal composition having a liquid crystal phase-isotropic phase transition temperature,
  introducing the liquid crystal composition in a liquid state into the mold cavity,
  maintaining the liquid crystal composition in the mold at an annealing temperature, and
  polymerizing the polymerisable liquid crystal composition while the liquid crystal composition is at the annealing temperature,
wherein the annealing temperature is chosen to be greater than the liquid crystal phase-isotropic phase transition temperature.

Preferably, the polymerizable liquid crystal composition is poured in the mold cavity at the annealing temperature and the polymerization of the liquid crystal composition is started once liquid crystals in the vicinity of the internal surfaces are in the liquid crystal state, e.g. the nematic liquid crystal state.

The main internal surfaces of the mold generally increase the liquid crystal phase-isotropic transition temperature of the liquid crystal composition in their vicinity. Thus preferably, the annealing temperature is lower than the temperature values at which liquid crystals which are positioned in closest vicinity of the interface with each of the main internal surfaces of the mold endure a liquid crystal phase-isotropic phase shift.

Finally, the invention also concerns a polarization-independent transmissive spatial phase modulator comprising two parallel aligned liquid crystal cells having different orientations from each other and an intermediate layer between the two liquid crystal cells for inducing the desired orientation for the liquid crystals in the cells, said intermediate layer being a monolayer made of a transparent thin film as defined above.

Figure 2:
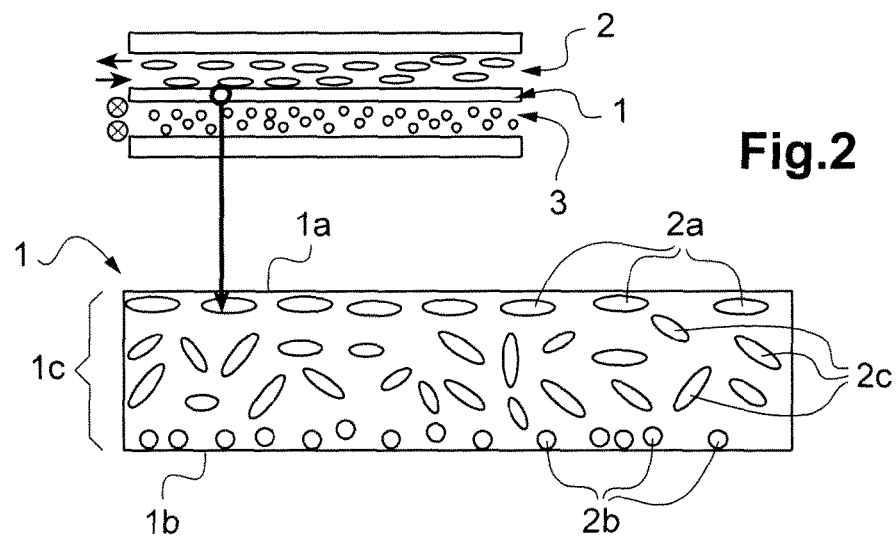
Figure 3:
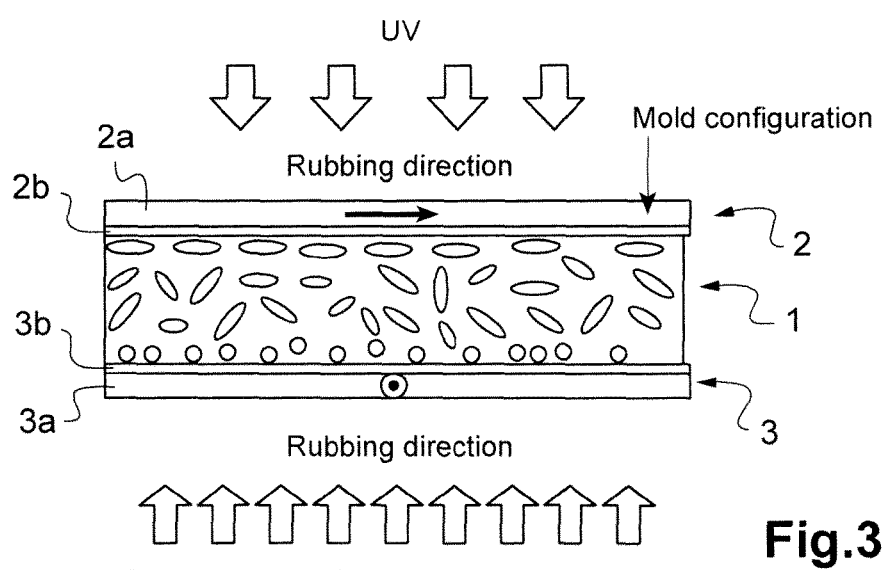
Figure 4:
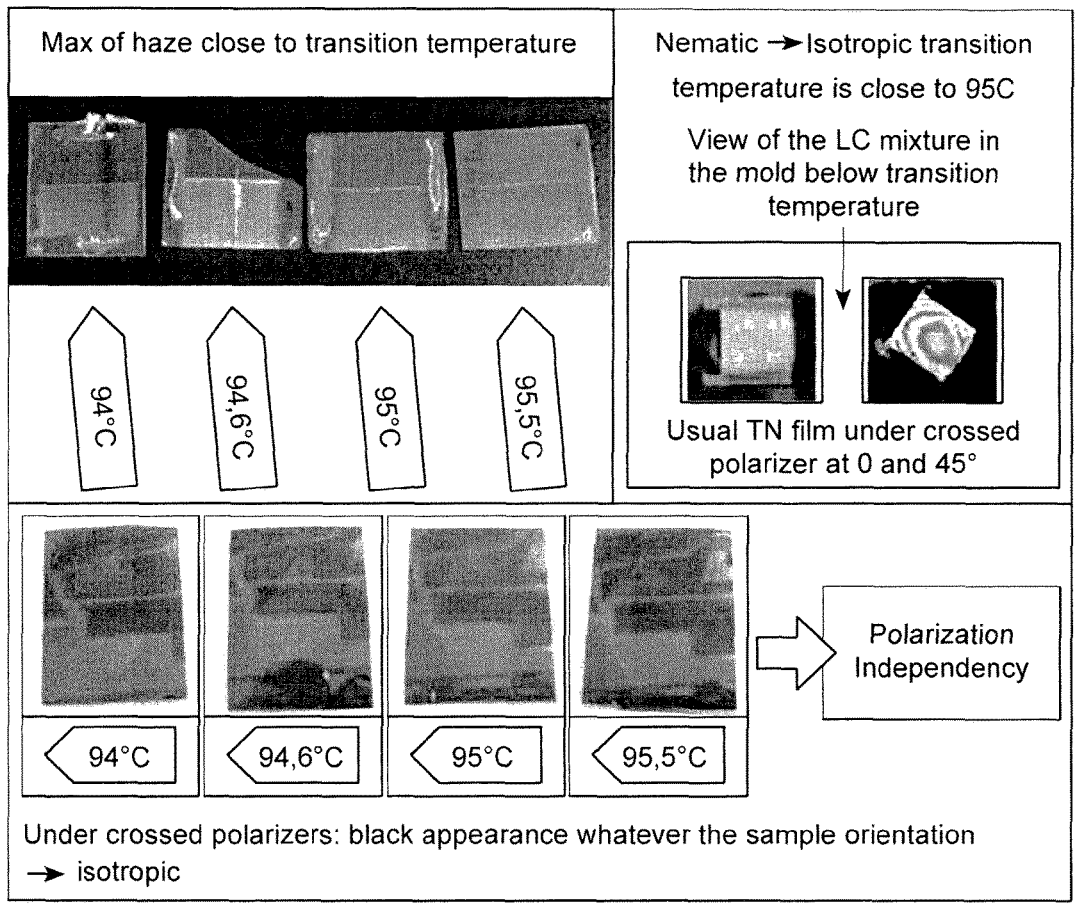
Figure 5:
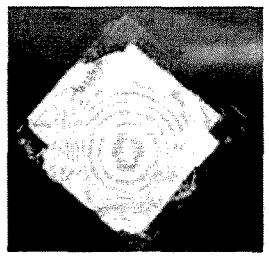
Figure 6:
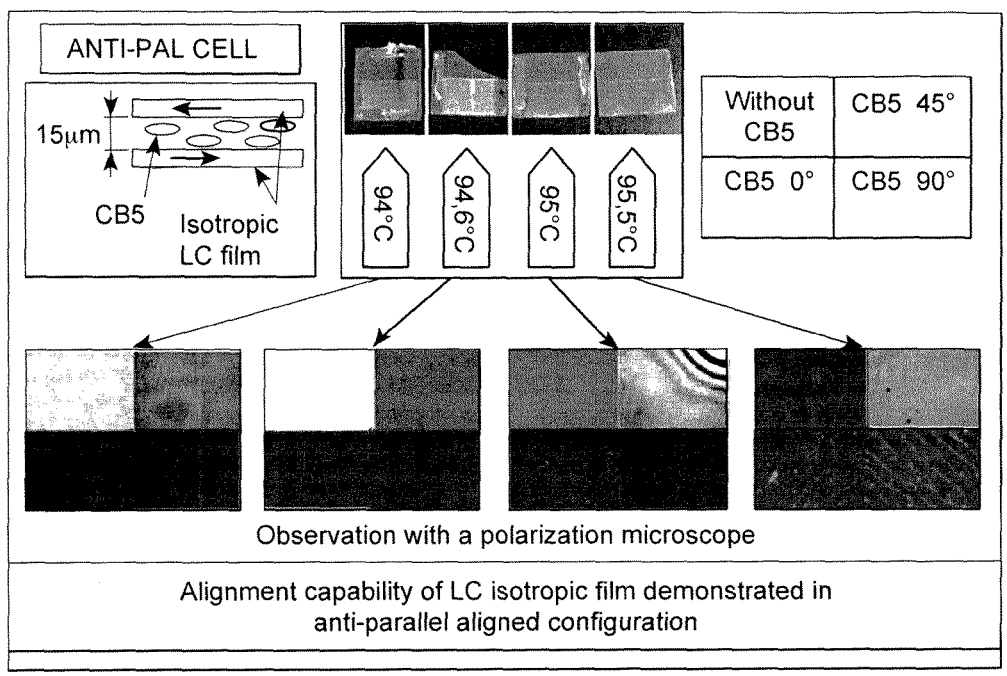
Figure 7:
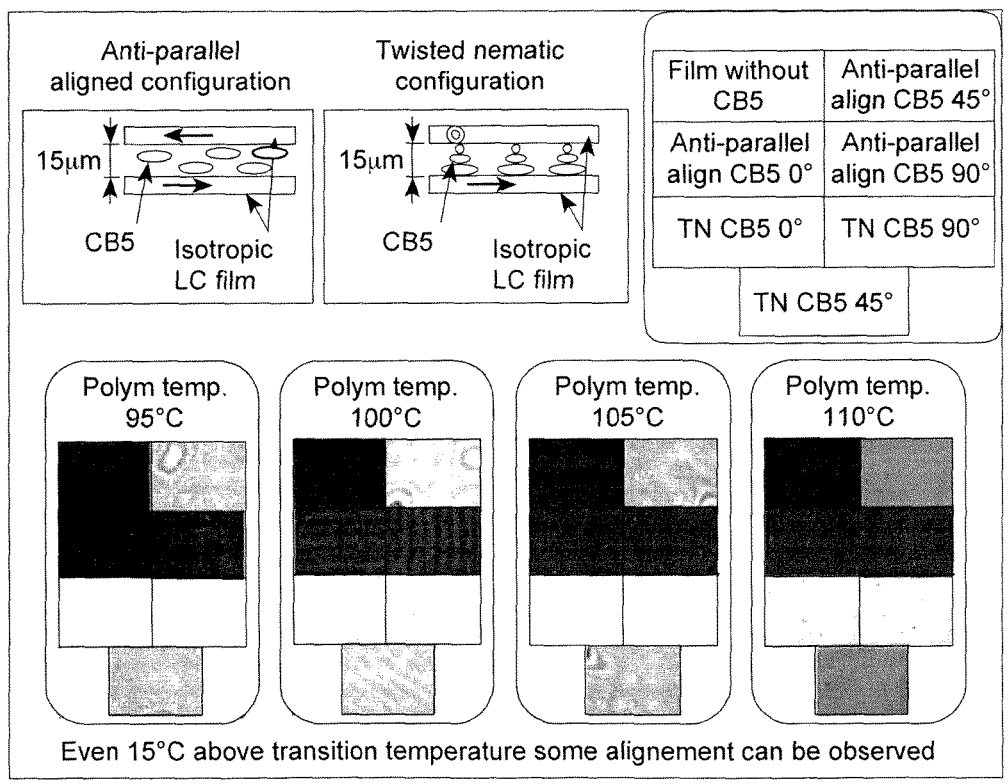
Figure 8:
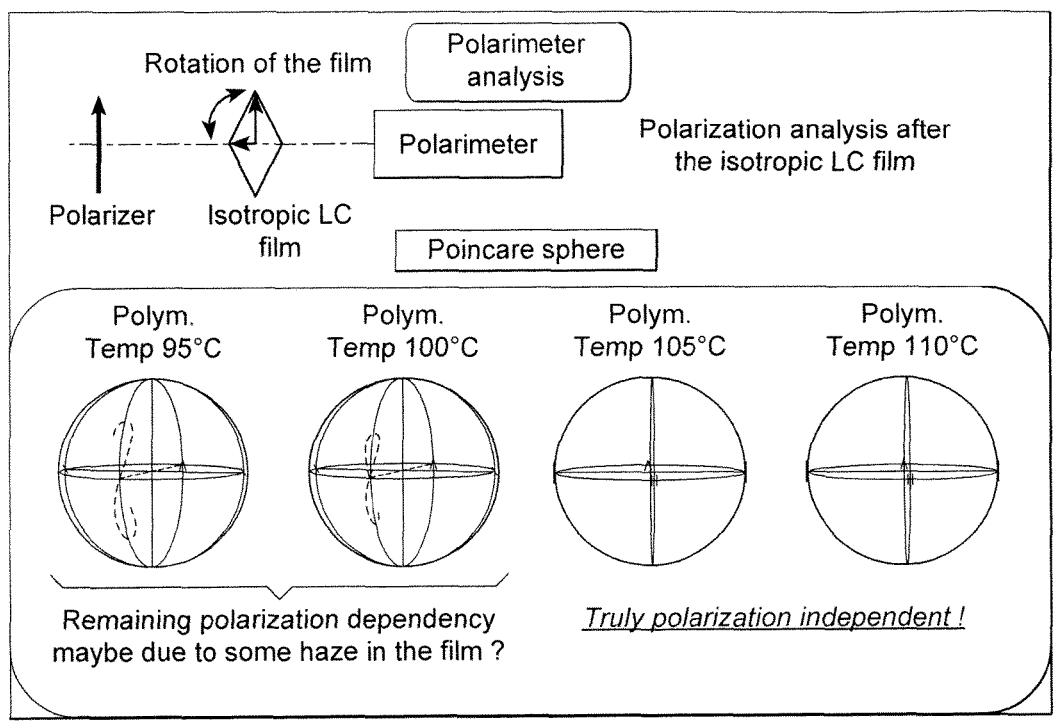
Figure 9:
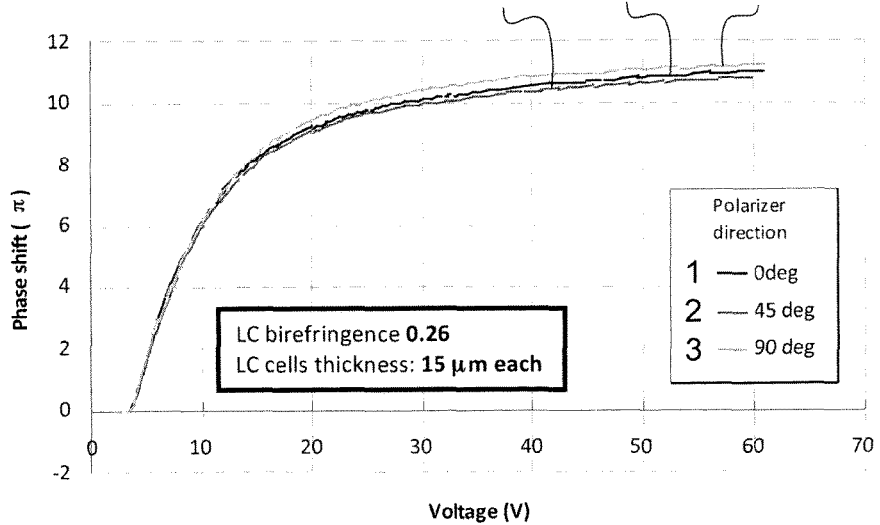
Figure 11:
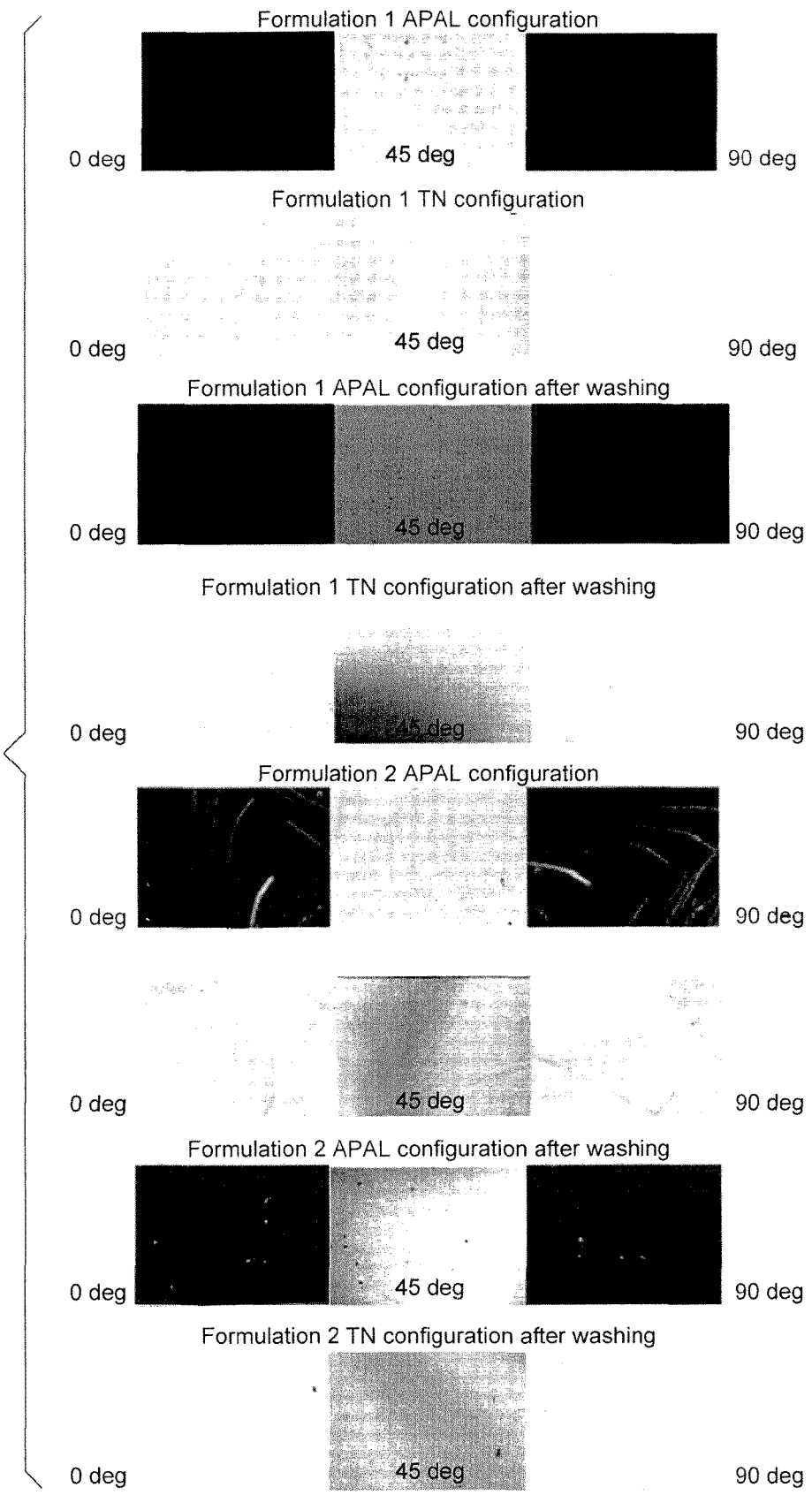

The invention will now be described in reference to the drawings which represent respectively:

FIG. 1, a schematic representation of a SPM according to prior art, comprising a central intermediate layer consisting in a film with two layers including parallel aligned liquid crystals with different orientation in each layer (typically crossed orientations);

FIG. 2, a schematic representation of a transparent thin film according to the invention and of a SPM comprising a central intermediate layer consisting of a monolayer made of a transparent thin film according to the invention;

FIG. 3, a schematic representation of the mold and steps for making a transparent thin film according to the invention;

FIG. 4, views of isotropic liquid crystal polymer film according to the invention, observed under crossed polarizer for different photopolymerization temperatures;

FIG. 5, a view of an intermediate layer composed of a film with two crossed parallel aligned liquid crystal polymer layers observed under crossed polarizer at 45° from the alignment directions;

FIGS. 6 and 7, views of liquid crystal cells with transparent thin films according to the invention, observed under a polarization microscope;

FIG. 8, a polarimeter analysis and results thereof for a transparent thin film according to the invention;

FIGS. 9 and 10, graphs of phase shift in function of applied tension at different polarization angles for, respectively, a double liquid crystal cell SPM with an intermediate layer according to the invention (photopolymerized at 100° C.) and a double liquid crystal cell SPM with an intermediate layer of the prior art comprising a film with two crossed aligned liquid crystal layers;

FIG. 11, views of another embodiment of the transparent thin film according to the invention, observed under a polarization microscope; and FIG. 12, a graph of phase shift in function of the applied tension at different polarization angles for a double liquid crystal cell SPM with the transparent thin film of FIG. 11 as an intermediate layer.

The present invention concerns principally transparent thin films including liquid crystals which, in particular, are advantageously usable as an intermediate layer for inducing alignment of the liquid crystals in liquid crystal cells of a spatial phase modulator (SPM).

In the following, one understand by liquid crystal phase a phase in which the liquid crystals mesogen are ordered, by opposition to an isotropic phase in which the liquid crystals are in the isotropic state, the liquid crystal phase is typically one of a nematic phase and a smectic phase. Thus, a liquid crystal phase-isotropic phase transition temperature, when applied to nematic liquid crystals means a nematic-isotropic transition temperature, and when applied to smectic liquid crystals means a smectic-isotropic transition temperature.

In one embodiment the invention uses liquid crystals which liquid crystal phase is a nematic phase; this embodiment revolves then around the nematic-isotropic transition temperature of such liquid crystals.

The transparent thin film of the present invention is typically a liquid crystal polymer film, preferably a photopolymerized film, in which the liquid crystals in the bulk of the film exhibit an isotropic orientation configuration and the liquid crystals in the vicinity of the film surfaces assume a desired alignment, different from one surface to the other.

As indicated above, the inventors have determined that the alignment capability of the liquid crystals of the cells of a SPM by means of an intermediate layer is only due to interactions with the surfaces of the intermediate layer and the liquid crystal molecules of the cells on both sides of the intermediate layer, and that the bulk of the layers of the film forming the intermediate layer of the SPM according to prior art shown in FIG. 1 is useless concerning the alignment capability of this intermediate layer.

But, this is because of the bulk of this bi-layered film of the prior art that some birefringence can appear if the respective thickness of the layers is not identical.

The thin transparent film of the invention overcomes this birefringence problem.

Furthermore, the use in SPM of the films of the present invention allows realizing intermediate layers having lower thicknesses, thereby reducing the shielding effect and consequently reducing the applied voltage needed to operate the SPM.

As seen in FIG. 2, the transparent thin film 1 of the invention comprises a first main surface 1a and a second main surface 1b and a bulk 1c comprised between the two main surfaces 1a and 1b. According to the invention, liquid crystal molecules, typically nematic liquid crystal molecules, are included in the bulk of the film.

In vicinity of the first main surface area 1a, liquid crystal molecules 2a are aligned along a main first direction, forming a layer of ordered liquid crystals, whereas in vicinity of the second main surface 1b, liquid crystal molecules 2b are aligned along a main second direction which is different from the main first direction, forming another layer of ordered liquid crystals. Typically, the main first and second directions are crossed at 90°.

The bulk of the film comprises a central zone in which liquid crystal molecules 2c are maintained in an isotropic arrangement.

Thus at least one central zone of the bulk 1c comprises liquid crystals in an isotropic arrangement, so that the film of the invention does not constitute a twisted nematic liquid crystal film.

However, the central zone 2c of isotropically arranged liquid crystals is generally such that all the liquid crystal is isotropic except few ordered liquid crystal layers in the immediate vicinity of the main surfaces 2a, 2b of the film.

Typically, the transparent thin film of the invention and, in particular the bulk thereof, comprises a matrix of polymerized monomers including liquid crystals.

In one embodiment of the transparent thin film of the invention, some liquid crystals, in particular in the bulk, are un-polymerized liquid crystals which are maintained in position by the matrix of polymerized monomers.

In another embodiment, at least some polymerized monomers of the matrix are liquid crystals. However, all of the polymerized monomers of the matrix can be polymerized liquid crystals. Further other monomers can be present into the matrix on top of polymerized liquid crystals. Further, part of the liquid crystals can be unpolymerized ones, which are maintained in position by the matrix of polymerized monomers while another part of the liquid crystals are part of the polymerized matrix.

The polymerizable monomers of the matrix can be thermally polymerizable, photopolymerizable (typically UV polymerizable), or both thermally polymerizable and photopolymerizable monomers. Preferably, the polymerizable monomers are photopolymerizable monomers.

The liquid crystals useful in the present invention are well known in the art and typically are nematic liquid crystals.

Such liquid crystals are either un-polymerizable liquid crystals (which will be maintained in position in a polymerized monomer matrix) and/or polymerizable liquid crystals which will participate to the formation of the polymerized matrix.

Among the un-polymerizable liquid crystals useful for the present invention, there can be cited the polyphenyl compounds, in particular the biphenyl and terphenyl compounds such as cyanobiphenyls and cyanoterphenyls with long aliphatic groups and mixtures thereof, cyclohexane compounds, phenylcyclohexane compounds and cyclohexylcyclohexane compounds, trifluorophenyl compounds, trifluoromethoxyphenyl compounds, difluoromethoxyphenyl compounds, as well as mixtures of these liquid crystals.

Among the polymerizable, preferably photopolymerizable, liquid crystal monomers, there can be cited liquid crystal compounds having polymerizable groups such as acrylate or methacrylate groups, or even epoxy or vinyl groups. Further, liquid crystals compounds based on thiolene groups could be considered in case they are polymerized according to a radical polymerization.

Numerous nematic liquid crystals are commercially available; For example, nematic liquid crystals are commercialized by Merck under the designations BL036, BL037, BL038, BL087, BL093, BL111, TL213, TL216, E7, E63, MLC-6621-000, MLC-6621-100, ZU-5049-000 and ZU-5049-100.

The matrix may comprise other polymerized monomers, formed from polymerizable, preferably photopolymerizable, monomers which are not liquid crystals. Such polymerizable monomers are well known in the art for making non-liquid crystals polymeric films. As examples of these monomers, there can be cited acrylate and methacrylate monomers such as, for example 2-ethylhexyl acrylate, dodecyl acrylate, trimethylolpropane triacrylate which are monomers that do not disturb the liquid crystal phase, here nematic phase, of the liquid crystals monomers. In one embodiment where the matrix contains some polymerized liquid crystals and some polymerized monomers, which are not liquid crystals, these non-liquid-crystal polymerizable monomers have preferably the property to lower the liquid crystal phase-isotropic phase transition temperature of the composition with regard to a composition comprising only the liquid crystals polymerizable monomers.

The transparent thin film of the invention has a thickness comprised in the interval [5 μm; 100 μm], preferably in the interval [10 μm; 50 μm] and better in the interval [15 μm; 35 μm), and typically of 25 μm.

Indeed, the layers of non-isotropic liquid crystals, e.g. liquid crystals still in the liquid crystal phase, found in the vicinity of one of the main surfaces and aligned along either the first or the second direction may represent a intra-layer with a thickness of 0.1 nm to 50 nm, typically from 1 nm to 20 nm or 1 nm to 30 nm, for example about 25 nm.

The process for manufacturing a transparent thin film according to the invention is a priori not obvious and will be now described in reference to FIG. 3. As mentioned above, the bulk of the transparent thin film is made of liquid crystals in an isotropic arrangement. Depending on the temperature used during the process, some of the liquid crystals not in direct vicinity to the main surfaces but close to the liquid crystals in the direct vicinity of the main surfaces may have a semi-oriented organization.

The mold for manufacturing the thin film 1 comprises a first part 2 and a second part 3, each comprising a supporting substrate (2a, 3a), for example made of glass, and a polymer coating (2b, 3b), for example a polyimide coating, the polymer coatings defining, respectively a first main internal surface and a second main internal surface of a molding cavity.

Hereafter the embodiments are often cited referring to a nematic liquid crystal mesogen. However it should be noted that the following embodiment could be applied to smectic liquid crystal mesogen.

According to the process of the invention, the first and second main surfaces of the mold cavity are subjected to a treatment adapted for inducing alignment of liquid crystals in nematic phase that are in the immediate vicinity of this first and second main surfaces. Such a treatment can comprise rubbing the polymer coating with a roller. The mold parts are then assembled, so that the rubbing directions are crossed 90°. However, in case such a product is desired, the rubbing directions may be crossed at an angle different of 90°.

A polymerizable mixture containing nematic liquid crystals mesogens in liquid state is poured in the mold cavity. The polymerizable mixture is either poured in the mold while at the annealing temperature above the nematic-isotropic transition temperature of the liquid crystals in the mixture, or is heated to the annealing temperature once proved in the mold. The mixture is finally polymerized while at the annealing temperature. The film is then demolded and recovered.

The nematic-isotropic transition temperature is easy to observe under polarization microscope using a heating stage.

It should be noted that the main difference with state of the art documents is that normally layers with anisotropic/organized surfaces are manufactured at temperatures below the nematic-isotropic transition temperature of the composition for a given process condition, in order to ensure that the liquid crystal monomers at the surface are ordered in an aligned state. In the invention, the temperature used is equal or greater than the nematic-isotropic transition temperature of the composition, called here-after bulk nematic isotropic transition temperature. In particular, it is comprised between the bulk nematic-isotropic transition temperature of the composition for a given process condition, such as for thin-film-manufacturing, and an interface-nematic-isotropic transition temperature of the composition for a given process condition.

The bulk nematic-isotropic transition temperature of the composition for a given process condition depends mainly on the LC composition such as the nature of the LC, the respective amount of each LC, and the potential presence of other monomers and/or components. For example for a given composition, the bulk nematic-isotropic transition temperature of the composition may be 94° C. which is the temperature at which a cell filled with such liquid crystal composition is observed as a black cell under crossed polarizer The interface-nematic-isotropic transition temperature of the composition for a given process condition depends on the parameters above and on the material creating the interface such as the mold surface's material.

The person skilled in the art knows very well how to assess the liquid-crystal phase/isotropic phase transition temperature of the composition. For example the nematic-isotropic transition temperature may be determined on a polarized microscope equipped with a heating stage and mounted in a cross polarized way. Below transition temperature, the layer shows at least partially some birefringence as the liquid crystals are at least partially in nematic phase, while above the transition temperature the birefringence disappear and the image seen through the microscope is black.

While the difference between the bulk liquid-crystal phase—isotropic phase transition temperature of the composition for a given process condition and the interface's liquid-crystal phase/isotropic phase transition temperature depends on an anchoring energy between the liquid crystal material and the mold surface's material, The interface nematic-isotropic transition temperature of the composition is thought to be greater than the bulk nematic-isotropic transition temperature of the composition by around 5° C. to 50° C. depending on the composition and the nature of the interfaces.

So the annealing temperature of the process of the invention is chosen as greater than the bulk nematic-isotropic transition temperature of the composition for a given process condition by an increase of temperature comprised in the interval [1° C.-50° C.], preferably in the interval [1° C.-30° C.], for example 10° C.

In a further embodiment the inventors have found that, for some thin films (up to 500 μm) built in molds, and for some liquid crystal compositions, when the annealing temperature is too close to the bulk liquid-crystal phase/isotropic phase transition temperature of the composition some haze may appear in the thin film of the invention.

Thus the inventors have identified that there is an embodiment that improves on the invention by enabling a haze-free thin film; such embodiment is that the annealing temperature of the process is chosen as greater than the bulk nematic-isotropic transition temperature of the composition by an increase of temperature of at least 5° C. such that it is comprised in the interval [5° C.-50° C.], preferably in the interval [5° C.-30° C.], for example in the interval [10° C.-20° C.].

It should be noted that the liquid crystal molecules in vicinity of a main surface, such as an alignment layer, are never fully parallel to the surface, but always make some angle with it. This angle is called the "pre-tilt angle". The pre-tilt angle is an angle made by the liquid crystals with regard to the plane of the alignment layer.

EXAMPLE 1

Manufacture of Transparent Thin Films

First, a glass mold was manufactured. Each substrate was coated with polyimide. The polyimide was rubbed with the following condition (rolling speed: 700 rpm, stage speed: 20 mm/s, indentation 0.1 mm). The mold was assembled, so that the rubbing directions of the upper and lower substrate were crossed by 90°. A flm spacer of 25 μm was used between the two glass substrates. The spacers were stuck with a UV glue (NOA81).

The mold was filled with a LC mixture comprising: a standard nematic LC material like E7 (distributed by the Merck & Co., Inc. Company), a reactive LC mesogen like RM257 (distributed by the Merck & Co., Inc. Company) and a photoinitiator like I184. In the following experiments, the relative proportions were E7 39 wt %, RM257 60 wt %, I184 1 wt %.

The mixture was heated at 60° C. to allow a good mixhg of the components. The mold was filled with the LC mixture by capillarity at 60° C. Then, the cell filled with this LC mixture was heated above the nematic-isotropic transition temperature. This temperature transition is easy to observe under polarization microscope using a heating stage. For the above mentioned mixture, the transition temperature in the LC cell is about 94° C. It is to be noted that as an alternative, the mold may be filled with the LC mixture at a temperature comprised between around 80° C. to around 90° C., as long as such temperature is lower than the bulk-nematic-isotropic transition temperature.

Finally, the film was photopolymerized under UV light during 10 min at 18 mW/cm².

Demolding of the film was first operated at 60° C. for the opening of the mold and room temperature for the delamination of the film.

It is assumed that the equivalent rubbing direction for one face of the isotropic LC polymer film, after polymerization, is opposite to the rubbing direction of polyimide on the mold surface. A person skilled in the art knows that the rubbing not only induces an axis but also a pre-tilt angle that will slightly tilt the LC molecules, thus the rubbing direction includes the axis of the rubbing but also a direction of the pre-tilt angle and two opposite rubbing direction are generally along the same axis. Rubbing directions at 0 deg or 180 deg are therefore not equivalent but different.

Several isotropic LC films were manufactured with photocuring at temperature ranging from 94° C. to 110° C.

Substrate: glass coated with polyimide rubbed along a direction

UV glue NOA81: Thiolene based photocurable glue (NORLAND)

Spacers: glass beads diameter 30 μm

Liquid crystals:

RM257 (Merck): 1,4-Bis-[4-(6-anyloyloxyhexyloxy) benzoyloxy]-2 methyl benzene

E7 (Merck): mixture of

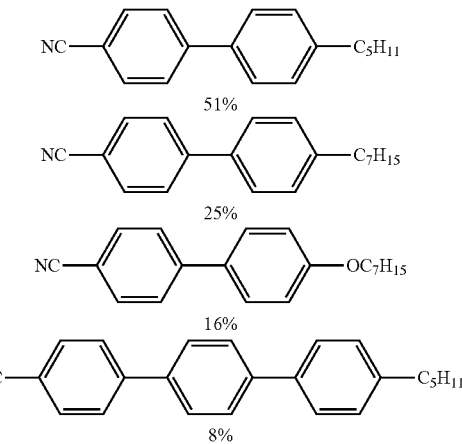

Photoinitiator I184 (Irgacure 184 CIBA GEIGY): 1-hydroxy-cyclohesyl-phenyl-ketone Manufacture of a Double Cell Structure To manufacture the double layer cell structure, patterned ITO electrodes with a polyimide coating were used. The substrates were obtained from the company EHC. The polyimide layers of the substrates were rubbed in the following conditions: roller speed 700 rpm, stage speed 20 mm/s, rubbing cloth indentation 0.1 mm. The rubbing directions were chosen so that between the upper and lower substrates, the rubbing directions were crossed by 90°. Bead spacers of 15 μm were dispersed in ethanol and deposited on the substrates by spin coating. The two substrates and the intermediate layer are then assembled in one double layer cell structure, so that the upper and lower cells are in an anti-parallel aligned configuration. The anti-parallel configuration means that for each cell the top and lower interfaces, i.e. an alignment layer of the substrate and the alignment direction of liquid crystals present in aligned state at the surface of the intermediate layer of the invention, are such that they provide to nearby liquid crystals an identical axis of alignment but have opposite direction of alignment. An LC material is finally inserted by capillarity in the space between the substrates and the intermediate layer in order to form upper and lower LC cells in anti-parallel configuration also called homogeneous configuration, crossed by 90° one from each other FIG. 2).

Substrates: glass
ITO: Indium-Tin Oxide
Spacers: glass beads of diameter 15 μm
Film and Cell Characterization Isotropic LC polymer films were photopolymerized at respectively around the transition temperature: 94° C., and, according to the invention above the transition temperature at 94.6, 95, 95.5, 100, 105, 110° C. It was first noticed that around the transition temperature (94° C.), a maximum of haze was observed. This can be attributed to microsize domaine LC orientations. Above 100° C., the haze was not observed by naked eye The observation of those films between crossed polarizers showed a dark state, whatever the orientation of the film between the polarizer. This means that the films are macroscopically in their isotropic phase (FIG. 7). For comparison, FIG. 5 shows the intermediate layer composed of layers n° 1a and 1b from FIG. 1, observed under crossed polarizer. The colors observed are due to the birefringence of the film. This birefringence is due to uncontrolled variation of thickness between layer n° 1a and layer n° 1b. Also for comparison, the insert of FIG. 4 shows the view under crossed polarizer of the LC mixture in the mold, when polymerized below the transition temperature. The pictures are typical from a twisted nematic configuration, which is logical considering the configuration of the mold.

In order to show the alignment capability of the isotropic LC polymer film of the invention, those films were used as substrate to make a LC cell according to the process above. Two parts of each film were assembled according to their assumed alignment direction in an anti parallel aligned configuration and in a twisted nematic configuration.

The films were separated by 15 μm bead spacers. The obtained cells were filled with CB5 liquid crystal 4-cyano-4'-pentyl biphenyl distributed by the Sigma-Aldrich company. The obtained LC cells were observed under a polarization microscope. The 0, 45 and 90° angles correspond to the angles between the input polarizer direction and the first isotropic LC layer orientation. The results are shown in FIG. 6 and FIG. 7. Extinction for cell orientation at 0 and 90° between crossed polarizer were observed in parallel aligned configuration as expected. Indeed, parallel aligned cells behave as uniaxial waveplates. When linear polarized light is parallel to the fast or slow axis, it sees only one refractive index. For other orientations, birefringence is not null and light can be seen through the crossed polarizers. For the twisted nematic configuration, called "TN", clear states for cell orientation at 0 and 90° between crossed polarizer were observed, also as expected. This demonstrates the alignment capabilities of the isotropic LC polymer film of the invention, the polymerization being done, here, between 1° C. to 15° C. above the nematic-isotropic transition temperature of 94° C. This shows that the embodiments of the invention, using a polymerization temperature higher than the bulk nematic-isotropic transition temperature, enables to deliver an isotropic film comprising liquid crystals in the vicinity of both surfaces of the isotropic LC polymer film of the invention that are arranged with enough order to impose their alignment to the LC of a cell made on top of such isotropic film.

This result was not obvious before the inventors thought to try it, because it meant that during the isotropic LC polymer film manufacturing, the interactions between the alignment layer and the LC mixture near their interfaces are strong enough to keep some alignment of the LC molecules according to the rubbing direction, while in the bulk of the film, the LC molecule orientations is completely random.

The polarization independency of the film isotropic LC polymer film was measured using a polarimeter commercialized by Thorlabs. The optical set-up is shown in FIG. 8.

A laser beam passes through a linear polarizer and an isotropic LC film of the invention before being analyzed by the polarimeter. The isotropic films were rotated around the beam axis and the change in polarization was recorded and plotted on a Poincare sphere. The result showed some small polarization dependency for the film photopolymerized at 95 and 100° C. This might be due to some haze in the film. But the films photopolymerized at 105 and 110° C. were found to be truly polarization independent.

Finally, the isotropic LC polymer films were tested by being mounted in a double layer LC cell structure as described above (see FIG. 2) and polarization independency properties during phase shift were studied. FIG. 9 shows the phase shift of the double layer LC cell as a function of the voltage applied for a double layer cell manufactured with an isotropic film photopolymerized at a temperature of 100° C. The LC material used for the LC cells has a birefringence of 0.26 and LC cell thicknesses are theoretically 15 μm. Some slight polarization dependency can be observed as the phase shift curves are not merged. This could be explained by thickness small inhomogeneities between the LC cells. However the phase shift dependency on polarization is below 5% at the highest voltage (60V).

As a comparison, FIG. 10 shows a similar measurement made with a cell structure done with the intermediate layer presented in FIG. 1. One sees that the phase shift dependency on polarization is around 10% for an applied voltage of 60V.

Another important result is the decrease of the minimal voltage required for starting a phase shift, called threshold voltage, in the case of double layer cell manufacture with isotropic film compared to a cell structure of FIG. 1. Indeed, in FIG. 9, phase shift starts to increase for voltages greater than 3.6 V whereas in FIG. 10 phase shift starts to increase for voltages greater than 6.6 V. Identically, in the ascendant part of the curves, 9.6V and 23V respectively, are required in FIG. 9 to reach a phase shift of $6\pi$ and $10\pi$ respectively, whereas 23V and 50V respectively, are required in FIG. 10 to reach a phase shift of $6\pi$ and $10\pi$ respectively. It is to be noted that those values are taken for the most efficient orientation for both cases: 90° for the isotropic intermediate thin film of the invention and 45° for the intermediate thin film of FIG. 1. This is a decrease of voltage of more than 50%. This decrease can be attributed to the thickness decrease of the intermediate layer.

In conclusion, true polarization independent intermediate layer and decrease of the applied voltage by decrease of the intermediate layer's thickness are the two main advantages of this invention.

EXAMPLE 2

Another set of experiments was realized to illustrate the feasibility of a second embodiment of the invention, namely: to make isotropic intermediate layer by mixing conventional monomers and reactive liquid crystal mesogens.

Twisted nematic (TN) mold were manufactured using glass slide and a thin polyimide layer with a small pretilt angle)(1-1.5°). It should be noted that the embodiments of the invention may be applied for pretilt angle greater than the 1-1.5° of example 2, and such as typically comprised between 0° and 90°.

Mold manufacturing process was described before but small changes were done.

The rubbing conditions were: rolling speed: 700 rpm, stage speed: 20 mm/s, depth: 0.1 mm. The two substrates were assembled in a twisted nematic configuration, i.e. the rubbing directions of both substrates were at 90° one from the other.

The substrates were glued together using a glue dispenser. The glue was NOA68 a photocurable glue distributed by NORLAND to which beads spacer of 30 μm where added. The spacers were dispersed at a concentration of 0.1 wt % in the glue.

Table 1 shows the formulation of the liquid crystal composition used to manufacture the isotropic intermediate layer.

TABLE 1

| Polymerizable mixture for intermediate layer | | | |
|---|---|---|---|
| Formulation | RM257 | Dodecyl acrylate | I184 |
| 1 | 90 wt % | 9 wt % | 1 wt % |
| 2 | 95 wt % | 4 wt % | 1 wt % |

RM257 is a polymerizable LC as described above.

Dodecyl acrylate is a conventional polymerizable monomer in the sense that it has no liquid crystalline properties.

Compositions from Table 1 were made and tested as material for isotropic intermediate layer. Within the twisted nematic mold used to manufacture the isotropic intermediate layer, the transition temperature from twisted nematic state to isotropic state was found to be around 90° C. for the formulation 1 and around 104° C. for the formulation 2.

As a consequence, following embodiments of the invention, polymerization temperatures of 5° C. or more than the transition temperature were chosen, namely 100° C. and 110° C. for composition 1 and 2 respectively. The films were polymerized 10 min at 20 mW/cm².

After demolding of the polymerized films, the alignment capabilities were evaluated by making double layer cells with the polymerized film serving as the intermediate alignment layer and observing the behavior of those cells using a polarized microscope.

CB5 liquid crystal was used to form the double layered cells used to check the alignment capability of those polymerized films. No spacer was used. The films were used as substrates in both Anti Parallel Aligned (APAL) and Twisted Nematic (TN) configuration. The pictures of FIG. 11 show the alignment properties of these films. It was shown also that after a soft washing of the film in ethanol, the alignment properties were kept.

In conclusion, alignment capabilities were shown for films made according to the second embodiment of the invention using a mixture of conventional monomer and polymerizable reactive mesogens.

These films were used as intermediate layer in a double layer cell configuration. The cells were characterized by measuring the phase shift as a function of the voltage and in dependency of linear polarization orientation at normal incidence. The curve is shown in FIG. 12. The cell showed polarization independency properties until at least 150V.

The higher threshold voltage observed in FIG. 12 compared to FIG. 10, could be explained by the change of material in the intermediate layer film. Dodecyl acrylate decreases probably the dielectric constant of the intermediate film and so induces a higher threshold voltage. However it is expected that using other conventional monomers could lead to smaller threshold voltage.

In conclusion, double layer cell structure could be manufactured with an isotropic intermediate layer made of a conventional monomer and a reactive mesogen.

The invention claimed is:

1. A transparent thin film comprising liquid crystals comprising:
   a first main surface in vicinity of which liquid crystals are aligned along a main first direction;
   a second main surface in vicinity of which liquid crystals are aligned along a main second direction different from the first direction; and
   a bulk between the two the main surfaces and comprising liquid crystals in an isotropic arrangement.

2. The film of claim 1, wherein the liquid crystals are nematic liquid crystals.

3. The film of claim 1, wherein the bulk comprises a matrix of polymerized monomers.

4. The film of claim 3, wherein the bulk comprises unpolymerized liquid crystals, maintained in position by a matrix of polymerized monomers.

5. The film of claim 3, wherein at least some monomers of the matrix of polymerized monomers are liquid crystals.

6. The film of claim 3, wherein at least some monomers of the matrix of polymerized monomers are conventional monomers.

7. The film of claim 3, wherein the polymerized monomers of the matrix are photopolymerized monomers.

8. The film of claim 1, wherein the liquid crystals aligned along each of the first and second direction form layers having a thickness of from 0.1 nm to 30 nm.

9. The film of claim 1, wherein the thin film has a thickness of from 5 μm to 100 μm.

10. The film of claim 1, wherein the main first direction and main second direction are at 90° relative to the other.

11. A process for manufacturing a film of claim 1, comprising the following steps:
   providing a mold for a film comprising a mold cavity defined by a first main internal surface and a second main internal surface, for which the first main internal surface and the second main internal surface respectively have been submitted to a treatment which is adapted to align liquid crystals that are close to the first and second main internal surfaces of the mold into liquid crystal phases ordered according to respectively a first predetermined direction and a second predetermined direction different from the first direction:

providing a polymerizable liquid crystal composition comprising at least a liquid crystal mesogen, the liquid crystal composition having a liquid crystal phase—isotropic phase transition temperature;

introducing the liquid crystal composition in a liquid state into the mold cavity;

maintaining the liquid crystal composition in the mold at an annealing temperature; and polymerizing the polymerizable liquid crystal composition while the liquid crystal composition is at the annealing temperature, wherein the annealing temperature is greater than the liquid crystal phase—isotropic phase transition temperature.

12. The process of claim 11, wherein the annealing temperature is lower than temperature values at which liquid crystals which are positioned in closest vicinity to the interface with each of the main internal surfaces of the mold endure a liquid crystal phase—isotropic phase shift.

13. The process of claim 11, wherein the annealing temperature is 1° C. to 50° C. higher than the liquid crystal phase—isotropic phase transition temperature.

14. The process of claim 11, wherein the liquid crystal composition is a photopolymerizable composition.

15. The process of claim 11, wherein the polymerizable liquid crystal composition comprises at least a polymerizable monomer further defined as:
    a polymerizable liquid crystal mesogen or a mixture of polymerizable liquid crystals mesogens;
    a polymerizable monomer or a mixture of polymerizable monomers other than liquid crystals mesogens; or
    a mixture of polymerizable liquid crystal mesogens and other polymerizable monomer.

16. The process of claim 11, wherein the polymerizable liquid crystal composition is poured into the mold cavity at a temperature lower than the liquid crystal phase—isotropic phase transition temperature.

17. The process of claim 11, wherein the polymerizable liquid crystal composition is poured into the mold cavity at the annealing temperature, and the polymerization of the liquid crystal composition is started once liquid crystals in the vicinity of the mold internal surfaces are in the liquid crystal state.

18. The process of claim 11, wherein the liquid crystal phase is a nematic phase mesogen.

19. The process of claim 11, further comprising treating the first and second main internal surfaces of the mold by rubbing the first and second main internal surfaces in the first and second predetermined directions, respectively.

20. A spatial phase modulator comprising two parallel or two anti-parallel aligned liquid crystal cells having different orientations from each other and an intermediate layer between the two liquid crystal cells for inducing the desired orientation for the liquid crystals in the cells, wherein the intermediate layer is a monolayer made of a transparent film of claim 1.

21. The spatial phase moderator of claim 20, wherein the liquid crystals are nematic liquid crystals.

22. The spatial phase moderator of claim 20, wherein the bulk comprises a matrix of polymerized monomers.

23. The spatial phase moderator of claim 20, wherein at least some monomers of the matrix of polymerized monomers are liquid crystals.

24. The spatial phase moderator of claim 20, wherein the liquids crystals aligned along each at the first and second direction form layers having a thickness of 0.1 nm to 30 nm.

25. The spatial phase moderator of claim 20, wherein the thin film has a thickness of 5 μm to 100 μm.

26. The spatial phase moderator of claim 20, wherein the main direction and main second direction are at 90° relative to the other.

* * * * *